United States Patent
Yamane et al.

(10) Patent No.: US 7,067,611 B2
(45) Date of Patent: Jun. 27, 2006

(54) POLYHYDROXYCARBOXYLIC ACID AND ITS PRODUCTION PROCESS

(75) Inventors: Kazuyuki Yamane, Fukushima (JP); Yukichika Kawakami, Fukushima (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 10/483,039

(22) PCT Filed: Jul. 5, 2002

(86) PCT No.: PCT/JP02/06835

§ 371 (c)(1),
(2), (4) Date: Jan. 6, 2004

(87) PCT Pub. No.: WO03/006525

PCT Pub. Date: Jan. 23, 2003

(65) Prior Publication Data

US 2004/0192881 A1    Sep. 30, 2004

(30) Foreign Application Priority Data

Jul. 10, 2001    (JP)    .............................. 2001-208801
Jul. 10, 2001    (JP)    .............................. 2001-208804

(51) Int. Cl.
    *C08G 63/02*    (2006.01)

(52) U.S. Cl. ...................... 528/354; 524/115; 524/430; 524/537; 524/539; 528/302; 528/361

(58) Field of Classification Search ................ 528/272, 528/283, 361, 491, 492, 499, 503, 302, 354; 524/537, 539, 115, 430
See application file for complete search history.

(56) References Cited

U.S. PATENT DOCUMENTS

| 2,668,162 | A |   | 2/1954  | Lowe           |         |
|-----------|---|---|---------|----------------|---------|
| 3,297,033 | A |   | 1/1967  | Schmitt        |         |
| 3,468,853 | A |   | 9/1969  | Schmitt        |         |
| 3,636,956 | A |   | 1/1972  | Schneider      |         |
| 5,028,667 | A |   | 7/1991  | McLain et al.  |         |
| 5,310,865 | A | * | 5/1994  | Enomoto et al. | 528/361 |
| 5,342,969 | A | * | 8/1994  | Ford et al.    | 549/274 |
| 6,140,458 | A | * | 10/2000 | Terado et al.  | 528/272 |

FOREIGN PATENT DOCUMENTS

| EP | 0469520    | 2/1992  |
|----|------------|---------|
| EP | 0805182    | 11/1997 |
| JP | 09-328481  | 12/1997 |
| JP | 10-060136  | 3/1998  |
| JP | 10-080990  | 3/1998  |
| JP | 10-138371  | 5/1998  |
| JP | 10-337772  | 12/1998 |
| JP | 2000-119269| 4/2000  |

* cited by examiner

*Primary Examiner*—Ana Woodward
(74) *Attorney, Agent, or Firm*—Dinsmore & Shohl LLP

(57) ABSTRACT

Polyhydroxycarhoxylic acids are provided, which are controlled in terms of the rate of biodegradability, and give molded or otherwise formed articles that are of uniform quality with neither premature strength drop nor premature deterioration of retention of outside shape, and their production process is provided as well. The poly-hydroxycarboxylic acids are obtained by ring-opening polymerization of cyclic esters. The polyhydroxy-carboxylic acids have a weight-average molecular weight (Mw) in the range of 10,000 to 1,000,000, a molecular weight distribution in the range of 1.0 to 2.5 as represented by the weight-average molecular weight-to-number-average molecular weight ratio (Mw/Mn) and a yellowness index (YI) of 40 or less, and have a precisely controlled rate of biodegradability.

22 Claims, No Drawings

POLYHYDROXYCARBOXYLIC ACID AND ITS PRODUCTION PROCESS

TECHNICAL FIELD

The present invention relates generally to a polyhydroxycarboxylic acid obtained by the ring-opening polymerization of cyclic esters such as glycolide or lactide and having biodegradability and its production process, and more specifically to a less colored polyhydroxycarboxylic acid having a controlled rate of biodegradation and its production process. In particular, the present invention is concerned with a polygylcolic acid (i.e., polyglycolide) that is less colored and improved in melt stability and its production process.

The polyhydroxycarboxylic acids of the present invention such as polyglycolic acid and polylactic acid or their copolymers are useful for various molded or otherwise formed articles such as sheet, films and fibers, composite materials (e.g., multilayer films or containers), and so on.

BACKGROUND ART

The ring-opening polymerization of bimolecular cyclic esters of hydroxycarboxylic acid (also called "cyclic dimmers") may yield polyhydroxycarboxylic acids. Typical of such cyclic esters are glycolide that is a bimolecular cyclic ester of glycolic acid and lactide that is a bimolecular cyclic ester of lactic acid. The ring-opening polymerization of glycolide yields polyglycolic acid (i.e., polyglycolide), and the ring-opening polymerization of lactide yields polylactic acid (i.e., polylactide).

Polyglycolic acid and polylactic acid obtained by the ring-opening polymerization of cyclic esters or polyhydroxycarboxylic acids such as ring-opened copolymers of lactide and glycolide have been known as biodegradable polymer materials, and their application to surgical sutures, etc. have been long proposed (for instance, U.S. Pat. Nos. 3,297,033 and 3,636,956).

Polyglycolic acid in particular, because of being better in heat resistance, gas barrier properties, mechanical strength, etc. than other biodegradable polymer materials, is finding new applications to sheets, films, vessels, injection-molded articles and so on (Japanese Patent Application Laid-open (A) Nos. 10-60136, 10-80990, 10-138371 and 10-337772).

These polyhydroxycarboxylic acids have difficulty in controlling their rate of biodegradation, although they are biodegradable and environmentally friendly polymer materials. So far, the rate of biodegradation of polyhydroxycarboxylic acids has generally been thought of as being dependent on their average molecular weight. The rate of biodegradation may be quantitatively determined to a certain degree by burying, for instance, a polyhydroxycarboxylic acid molded article in the ground to observe the period of its disintegration. This method is called soil degradability test.

When polyhydroxycarboxylic acid molded articles are tested for their degradability in the ground, it has so far been considered that the higher the weight-average molecular weight of polyhydroxycarboxylic acids, the longer the period of time needed for disintegration becomes, and the lower the weight-average molecular weight, the shorter the period of disintegration time becomes. It is understood that when polyhydroxycarboxylic acids have a very low weight-average molecular weight, their time of disintegration in the ground is generally short.

However, the results of the inventors' studies have indicated that the rate of biodegradation of polyhydroxycarboxylic acids is not necessarily dependent on their average molecular weight such as weight-average molecular weight. The same holds true even when instead of weight-average molecular weight, solution viscosity, melt viscosity and so on are used as the index to average molecular weight.

In general, when polyhydroxycarboxylic acids have a fast rate of biodegradation, they have some merits: biodegradation of used-up polyhydroxycarboxylic acid molded articles and ease with which they can be composted. However, such molded articles have limited applications to very-short-time fields or low-strength fields.

When polyhydroxycarboxylic acid molded articles such as films or containers are used in application fields where durability and outside shape retention on much the same order as in ordinary plastic molded articles are expected, too a fast rate of biodegradation causes premature drops of articles' strength, and makes it difficult to retain the outside shape of articles over an extended period of time. Thus, there have been attempts to obtain molded articles improved in durability and outside shape retention without detriment to their biodegradability by allowing polyhydroxycarboxylic acids to have higher molecular weight.

Contrary to expectation, however, it has been found that only by use of high-molecular-weight polyhydroxy-carboxylic acids, it is still difficult to keep hold of strength and outside shape while premature biodegradability is fully minimized. In addition, it is still difficult to make products of consistent quality because there are variations in the rate of biodegradation for each polyhydroxycarboxylic acid production lot. On the other hand, polyglycolic acids obtained by the ring-opening polymerization of glycolide are vulnerable to coloration upon polymerization at elevated polymerization temperatures for long periods of time.

Thus, it is still difficult to control the rate of biodegradation of polyhydroxycarboxylic acids while their coloration is reduced, and anything significant about how to achieve this is not proposed at all.

Referring to the polyglycolic acid encompassed in polyhydroxycarboxylic acids, there is unavailable any well-established production technique as yet, and so it is still difficult to produce polyglycolic acid that can yield less colored molded articles.

Polyglycolic acid, when it is poor in melt stability, makes it impossible to mold its melt in a stable manner. Polyglycolic acid, when it is vulnerable to coloration, detracts from commercial value, and offers hygienic problems as well. When polyglycolic acid has a fast rate of biodegradation, it is difficult to put the service life of product under control although the polyglycolic acid can be easily composted.

U.S. Pat. No. 3,297,033 discloses that ring-opening polymerization is carried out at 185 to 190° C. while glycolide mixed with a polymerization catalyst is charged into a glass tube, and that white polymers are obtained after cooling (Example 1). By carrying out the ring-opening polymerization at temperatures lower than the melting point (about 220° C.) of polyglycolic acid, it is thus possible to obtain less colored polymers.

However, lower polymerization temperatures render the resulting polymer likely to crystallize and solidify during polymerization reactions, whereby the polymerization reactions tend to become inhomogeneous. The resulting polyglycolic acid is so poor in melt stability that when extrusion molded into various articles such as sheets, films and fibers, it is difficult to carry out extrusion molding in a stable fashion because of large melt viscosity changes.

U.S. Pat. No. 3,468,853 discloses a process wherein glycolide mixed with a polymerization catalyst is subjected to ring-opening polymerization at a temperature of 205 to 235° C. until viscosity reaches a substantial equilibrium. However, long-term ring-opening polymerization at elevated temperatures often causes the resulting polyglycolic acid to be colored, greatly detracting from commercial value.

U.S. Pat. No. 2,668,162 discloses a polyglycolic acid production process wherein glycolide mixed with a polymerization catalyst is subjected to ring-opening polymerization at 150 to 200° C. to produce a low-molecular-weight polymer, and the polymer is then heated to 220 to 245° C. to increase its melt viscosity. With this process, however, it is difficult to prevention coloration of the resulting polyglycolic acid because a time-consuming heating step is needed and rapid heating tends to lead to heating variations.

DISCLOSURE OF THE INVENTION

An object of the present invention is to provide polyhydroxycarboxylic acid that is controlled in terms of the rate of biodegradation and reduced in respect of coloration, and its production process.

Another object of the present invention is to provide polyhydroxycarboxylic acid that can yield a molded or otherwise formed article showing uniform quality with no premature drops of strength and outside shape retention.

Yet another object of the present invention is to provide polyglycolic acid that is remarkably improved in terms of melt stability and, at the same time, is reduced in respect of coloration, and its production process.

A further object of the present invention is to provide polyglycolic acid that is excellent in melt stability, less colored, and of controlled biodegradability, and its production process.

As a result of studies of why the rate of biodegradation of polyhydroxycarboxylic acid is not necessarily depending on its average molecular weight, the inventors have noted that conventional polyhydroxycarboxylic acids have not any well-controlled molecular weight distribution. When polyhydroxycarboxylic acid has a wide molecular weight distribution, it has a high weight-average molecular weight or melt viscosity on average; however, the part (low-molecular-weight part) of polyhydroxycarboxylic acid in a low-molecular-weight region is subjected to premature biodegradation, which may otherwise cause the whole strength of product to drop and the outside shape of product to become worse. In addition, the presence of a large amount of the low-molecular-weight part sensitive to premature biodegradation may cause the rate of biodegradation of the whole polyhydroxycarboxylic acid molded product to become fast.

Therefore, the inventors have pursued studies, finding that a polyhydroxycarboxylic acid having a specific range of weight-average molecular weight and a relatively sharp molecular weight distribution shows practical strength properties with a controlled rate of biodegradation, and yields a molded article of uniform quality.

A narrow molecular weight distribution of polyhydroxycarboxylic acid implies that it is subjected to substantially uniform biodegradation because of a reduced amount of the low-molecular-weight part susceptible to biodegradation. Consequently, it is possible to obtain polyhydroxycarboxylic acid that has controlled biodegradability and limited variations in the rate of biodegradation. By regulating the molecular weight distribution to a narrow range and adjusting the weight-average molecular weight of polyhydroxycarboxylic acid, it is possible to control the rate of biodegradation as desired.

On the other hand, it has also been found that when the polymerization reaction is carried out at high polymerization temperatures for a long period of time for the adjustment of the molecular weight distribution of polyhydroxycarboxylic acid, the resulting polymer is sensitive to coloration. At lower polymerization temperatures, however, the molecular weight distribution tends to become wide. With this in mind, after the polymerization for polyhydroxycarboxylic acid was carried out, an additional polymerization was performed at a temperature lower than the polymerization temperature. As a result, it has been found that polyhydroxycarboxylic acid having a sharply controlled molecular weight distribution can be obtained while its coloration is considerably reduced. For this process, it is preferable that the first polymerization for polyhydroxycarboxylic acid should be carried out at a relatively high temperature for a relatively short time.

Furthermore, the inventors have found that polyglycolic acid having much more improved melt stability and a reduced yellowness index (YI) can be obtained by subjecting glycolide to ring-opening polymerization in a molten state, then converting the resulting polymer from the molten state to a solid state, and finally kneading the solid-state polymer in a molten state with the application thereto of heat. After conversion to the solid state, it is acceptable to carry out a solid-phase polymerization followed by kneading in a molten state.

In accordance with the process of the present invention, it is possible to obtain polyglycolic acid having improved melt stability as expressed in terms of the retention of melt viscosity of at least 40%, and/or the yellowness index (YI) of up to 40 as measured using a sheet obtained by press molding and crystallization of the polyglycolic acid. It is here noted that the retention of melt viscosity is defined by the ratio of the viscosity ($\eta 60$) measured after a 60-minute retention at 250° C. to the initial viscosity ($\eta_0$) measured after a 5-minute preheating at 250° C. (i.e., ($\eta_{60}/\eta_0$)×100).

The polyglycolic acid having improved melt stability according to the present invention is excellent in melt stability upon melt molding, and so can provide molded or otherwise formed articles having improved color tone such as sheets, films and fibers. By regulating the weight-average molecular weight and molecular weight distribution of the polyglycolic acid, it is also possible to place the biodegradability of the polyglycolic acid under control.

The present invention has been accomplished on the basis of these findings.

Thus, according to one aspect of the present invention there is provided a polyhydroxycarboxylic acid obtained by ring-opening polymerization of a cyclic ester and controlled in terms of the rate of biodegradation, characterized in that said polyhydroxycarboxylic acid has:

(a) a weight-average molecular weight (Mw) in the range of 10,000 to 1,000,000, (b) a molecular weight distribution in the range of 1.0 to 2.5 as defined by the weight-average molecular weight-to-number-average molecular weight ratio (Mw/Mn), and (c) a yellowness index (YI) of up to 40 as measured using a sheet obtained by press molding and crystallization of said polyhydroxycarboxylic acid.

According to another aspect of the present invention, there is provided a polyhydroxycarboxylic acid production process characterized by subjecting a cyclic ester to ring-opening polymerization at a polymerization temperature of 120 to 250° C. for 3 minutes to 50 hours, and then to an additional polymerization for 1 to 50 hours at a temperature 10 to 50° C. lower than said polymerization temperature.

According to yet another aspect of the present invention, there is provided a polyglycolic acid having melt stability characterized by having:

(I) a retention of melt viscosity of at least 40% as defined by the proportion of the viscosity ($\eta 60$) of said polyglycolic acid measured after a 60-minute retention at 250° C. to the initial viscosity ($\eta_0$) of said polyglycolic acid measured after a 5-minute preheating at 250° C. ($\eta_{60}/\eta_0 \times 100$), and/or (II) a yellowness index (YI) of up to 40 as measured using a sheet obtained by press molding and crystallization of said polyglycolic acid.

According to a further aspect of the present invention, there is provided a process for producing a polyglycolic acid having melt stability comprising steps of (1) subjecting glycolide to ring-opening polymerization in a molten state, (2) converting the resulting polymer from the molten state to a solid state, (3) subjecting the polymer to an additional solid-phase polymerization in the solid state, as desired, and (4) kneading the solid-state polymer in a molten state with the application of heat thereto.

BEST MODE FOR CARRYING OUT THE INVENTION

1. Cyclic Ester

For the cyclic ester used herein, bimolecular esters of hydroxycarboxylic acids may be used. The hydroxy-carboxylic acids, for instance, include glycolic acid, L-lactic acid, D-lactic acid, α-hydroxybutyric acid, α-hydroxyisobutyric acid, α-hydroxyvaleric acid, α-hydroxycaproic acid, α-hydroxyisocaproic acid, α-hydroxyheptanoic acid, α-hydroxyoctanoic acid, α-hydroxydecanoic acid, α-hydroxymyristic acid and α-hydroxystearic acid, which may or may not have been substituted by alkyl groups.

Of the cyclic esters, preference is given to glycolide that is a bimolecular cyclic ester of glycolic acid as well as L-lactide and D-lactide that are bimolecular cyclic esters of lactic acid, although the glycolide is most preferred. The ring-opening polymerization of glycolide gives polyglycolic acid, and the ring-opening polymerization of lactide gives polylactic acid. The glycolide and lactide may be copolymerized together.

Generally but not exclusively, the glycolide may be produced by the thermal depolymerization of glycolic acid oligomers. For instance, the glycolic acid oligomers may be depolymerized by such a solution depolymerization process as set forth in U.S. Pat. No. 2,668,162, such a solid-phase depolymerization process as set forth in JP-A 2000-119269, and such a solution depolymerization process as described in JP-A 09-328481. Glycolide obtained as cyclic condensates of chloroacetic acid salts as reported by K. Chujo et al. "Die Makromolekulare Cheme", 100(1967), pp. 262–266, too, may be used.

Glycolide, and lactide may be copolymerized with other comonomers which, by way of example, include cyclic monomers such as ethylene oxalate (i.e., 1,4-dioxane-2,3-dione), lactones (e.g., β-propiolactone, β-butyrolactone, pivalolactone, γ-butyrolactone, δ-valerolactone, β-methyl-δ-valerolactone, and ε-caprolactone), trimethylene carbonate and 1,3-dioxane; hydroxycarboxylic acids such as lactic acid, 3-hydroxypropanoic acid, 3-hydroxybutanoic acid, 4-hydroxybutanoic acid and 6-hydroxycaproic acid as well as alkyl esters thereof; and substantially equimolar mixtures of aliphatic diols such as ethylene glycol and 1,4-butanediol and aliphatic dicarboxylic acids such as succinic acid and adipic acid or alkyl esters thereof. These comonomers may be used in combination of two or more.

Particularly preferred among those comonomers are cyclic compounds such as lactones and trimethylene carbonate; and hydroxycarboxylic acids such as lactic acid and glycolic acid because they are so sensitive to copolymerization that copolymers having excellent physical properties can be easily obtained.

The comonomer(s) is used in an amount of usually up to 45% by weight, preferably up to 30% by weight, and more preferably up to 10% by weight of all the charged monomers. By copolymerization, it is possible to obtain ring-opened copolymers having the desired physical properties. For instance, by the ring-opening polymerization of glycolide with other monomer(s), it is possible to lower the melting point and, hence, processing temperature of polyglycolic acid, and control the rate of crystallization of polyglycolic acid, thereby improving its processability on extrusion or elongation.

2. Polyhydroxycarboxylic Acid

To control the rate of biodegradation, the polyhydroxycarboxylic acids of the present invention, for instance, polyglycolic acid, polylactic acid and glycolide/lactide copolymers should essentially have a weight-average molecular weight (Mw) in the range of 10,000 to 1,000,000 and a molecular weight distribution (also called the degree of multidispersion) in the range of 1.0 to 2.5 as expressed by the weight-average molecular weight-to-number-average molecular weight (Mw/Mn).

If the weight-average molecular weight (Mw) of the polyhydroxycarboxylic acid of the present invention is within the range of 10,000 to 1,000,000, satisfactory melt moldability and mechanical strength can then be achieved, and the rate of biodegradation of the polyhydroxycarboxylic acid can be controlled by regulating its weight-average molecular weight. The weight-average molecular weight should be within the range of preferably 20,000 to 800,000 and more preferably 30,000 to 600,000. In most cases, satisfactory physical properties are obtainable within the range of 50,000 to 500,000. Too low a weight-average molecular weight causes molded articles to become brittle and too high a weight-average molecular weight makes melt molding difficult.

By limiting the molecular weight distribution of the polyhydroxycarboxylic acid of the present invention to within the range of 1.0 to 2.5, the amount of a polymer component (low-molecular-weight portion) susceptible to premature biodegradation can be reduced to control the rate of biodegradation of the polyhydroxycarboxylic acid. Too large a molecular weight distribution makes the rate of biodegradation of the polyhydroxycarboxylic acid unlikely to depend on the weight-average molecular weight (or melt or solution viscosity) thereof. This molecular weight distribution should be in the range of preferably 1.3 to 2.4, and more preferably 1.5 to 2.3.

The rate of biodegradation may be controlled by setting the weight-average molecular weight within the aforesaid range and regulating the molecular weight distribution in the aforesaid range. More specifically, when a molded article comprising polyhydroxycarboxylic acid is disintegrated in the ground, the rate of disintegration (the rate of biodegradation) can be retarded. Too large a molecular weight distribution causes the rate of biodegradation to become fast, making the rate of biodegradation less likely to depend on the molecular weight, even when the weight-average molecular weight is increased. A narrow molecular weight distribution also makes it possible to control the rate of biodegradation by the weight-average molecular weight.

When formed into a sheet by press molding and crystallization, the polyhydroxycarboxylic acid of the present invention has a yellowness index (YI) of as low as 40 or less or it is considerably reduced in terms of coloration. This yellowness index should be preferably up to 35, and more preferably up to 30. In most cases, the yellowness index may be reduced down to up to 25, and preferably up to 20. The yellowness index should be usually at least 5 or, in most cases, at least 8 although it should preferably be reduced as much as possible. When the polyhydroxycarboxylic acid has too high a yellowness index, it gives a molded article of diminished commercial value because of being browned or otherwise considerably colored. In addition, it is difficult to color the polyhydroxycarboxylic acid to the desired tone using coloring agents. It has been reported that considerably colored articles offer hygienic problems in the fields of food packaging material and medical appliances.

The polyhydroxycarboxylic acid of the present invention should preferably be excellent in terms of melt stability on melt molding. More specifically, the polyhydroxycarboxylic acid of the present invention should preferably have much more improved melt stability as expressed by the retention of melt viscosity of at least 40%, which is defined by the proportion of the viscosity ($\eta_{60}$) measured after a 60-minute retention at 250° C. to the initial viscosity ($\eta_0$) measured after a 5-minute preheating at 250° C.: ($\eta_{60}/\eta_0$)×100.

In view of melt stability, the polyhydroxycarboxylic acid of the present invention should also preferably be such that when heated from 50° C. at a heating rate of 2° C./min. in a nitrogen stream at a flow rate of 10 ml/min., the temperature at which the per cent loss from weight at 50° C. becomes 1% is 200° C. or higher.

3. Polyglycolic Acid Having Melt Stability

The polyhydroxycarboxylic acid of the present invention should preferably be a polyglycolic acid excellent in melt stability. The polyglycolic acid having melt stability according to the present invention is now explained at great length.

The present polyglycolic acid having melt stability is not only excellent in melt stability on melt molding but less colored as well. The melt stability may be objectively evaluated by the retention of melt viscosity, which is defined by the proportion of the viscosity ($\eta_{60}$) measured after a 60-minute retention at 250° C. to the initial viscosity ($\eta_0$) measured after a 5-minute preheating at 250° C.: ($\eta_{60}/\eta_0$)×100.

The present polyglycolic acid having melt stability can have a retention of melt viscosity of at least 40% in general, at least 50% in many cases, and at least 60% in particular. The retention of melt viscosity is usually at least 80%, and at least 75% in most cases, although it should preferably be as high as possible.

When the polyglycolic acid is molded by general melt molding processes such as extrusion molding, the smaller the change in its retention of melt viscosity, the more stably the molding can be carried out. When the retention of melt viscosity of the polyglycolic acid is too low, for instance, it is difficult to provide stable molding because there are fluctuations of torque on extrusion and breaks in sheets or films that are being extruded. When the polyhydroxycarboxylic acid used has too low melt stability, much volatile components are generated during extrusion, often depositing onto members such as rolls.

When formed into sheets by press molding and crystallization, the present polyglycolic acid having melt stability has a yellowness index (YI) of as low as 40 or less or it is considerably reduced in terms of coloration.

The present polyglycolic acid having melt stability should preferably be such that when heated from 50° C. at a heating rate of 2° C./min. in a nitrogen stream at a flow rate of 10 ml/min., the temperature at which the per cent loss from weight at 50° C. becomes 1% is 200° C. or higher. As the temperature at which the per cent loss in weight becomes 1% is lower than 200° C., much volatile gases are generated during melt molding, depositing onto the resulting article to cause damage on its outside shape or depositing onto each part of the molding machine to cause contamination thereof. This temperature should be preferably 210° C. or higher, and more preferably 220° C. or higher, although it should preferably be as high as possible. However, the upper-limit temperature is usually 245° C. or lower, and often 240° C. or lower.

The present polyglycolic acid having melt stability should preferably have a melt viscosity in the range of 10 to 100,000 Pa·s as measured at a temperature of 240° C. and a shear rate of 122/sec. This melt viscosity should be in the range of more preferably 50 to 20,000 Pa·s, and even more preferably 100 to 10,000 Pa·s. When the polyglycolic acid having too low a melt viscosity is molded into an article, the article tends to become brittle due to decreased mechanical strength. Too high a melt viscosity renders it difficult to subject the polyglycolic acid to melt molding.

In view of melt moldability and control of biodegradation, the present polyglycolic acid having melt stability should preferably have a weight-average molecular weight (Mw) in the range of 10,000 to 1,000,000 and a molecular weight distribution (i.e., the degree of multidispersion) in the range of 1.0 to 2.5 as expressed by the weight-average molecular weight-to-number-average molecular weight ratio (Mw/Mn).

The present polyglycolic acid having melt stability should preferably be provided in the form of pellets having a length of 1 to 10 mm and a thickness of 1 to 10 mm. In consideration of shape, the pellet is effective for carrying out molding in stable fashions. As pellet size (length and thickness) becomes smaller than that in the aforesaid range, the resin becomes vulnerable to electrostatic adherence to a molding machine during molding. Too large size results not only in time-consuming melting but also in the need of application of excessive thermal hysteresis.

4. Polyhydroxycarboxylic Acid Production Process

Polyhydroxycarboxylic acids may be produced by the ring-opening polymerization (inclusive of ring-opening copolyermization) of such cyclic esters as mentioned above. Usually, the polyhydroxycarboxylic acids are obtained by the ring-opening polymerization of cyclic esters in a bulk form.

To permit the weight-average molecular weight (Mw) and molecular weight distribution (Mw/Mn) of a specific polyhydroxycarboxylic acid to come within the given ranges, for instance, it is of importance to predetermine (i) the type and amount of a polymerization catalyst, (ii) the type and amount of a molecular weight modifier, (iii) polymerization conditions such as polymerizers, polymerization temperature and polymerization time and (iv) post-polymerization treatments, and how these factors are combined is also of importance.

To control the molecular weight of a polyhydroxycarboxylic acid product while the coloration of the product is reduced, it is preferable to use a process comprising a first ring-opening polymerization step (or the first polymerization step) and an additional polymerization step (or the second polymerization step) that is carried out for 1 to 50 hours at a temperature 10 to 50° C. lower than the first polymerization temperature.

By way of example but not by way of limitation, the polymerization catalysts used herein include tin compounds such as tin halides (e.g., tin dichloride and tin tetrachloride) and organic carboxylic acid tin (e.g., tin octoate); titanium compounds such as alkoxytitanate; aluminum compounds such as alkoxyaluminum; zirconium compounds such as zirconium acetylacetone; and antimony halides. The amount of the polymerization catalyst used is, for example, in rage of preferably 1 to 1,000 ppm, and more preferably 3 to 300 ppm on a weight ratio basis relative to the cyclic ester.

For control of the weight-average molecular weight, higher alcohols such as lauryl alcohol may be added as the molecular weight modifier. For the purpose of improving physical properties, it is acceptable to add polyhydric alcohols such as glycerin.

For the reactor used, an appropriate selection may be made from various polymerization vessels such as those of the extruder type, the upright type having a paddle blade, the upright type having a helical ribbon blade, the horizontal extruder or kneader type, the ampoule type and the tubular type.

The temperature for the ring-opening (first) polymerization may be determined in the range of 120° C. to 250° C. The polymerization temperature should be in the range of preferably 130 to 240° C., more preferably 140 to 230° C., and even more preferably 150 to 225° C. At too low polymerization temperatures the molecular weight distribution of the polymer product tends to become wide whereas at too high polymerization temperatures the polymer product is sensitive to thermal decomposition.

The time for the ring-opening (first) polymerization may be chosen from the range of 3 minutes to 50 hours. To keep the polymer product from coloration, it is preferable to shorten the polymerization time as the polymerization temperature becomes high. To make the molecular weight distribution sharp while the coloration of the polymer product is reduced, it is preferable to use polymerization conditions comprising a relatively high polymerization temperature and a relatively short polymerization time. The polymerization time is preferably in the range of 5 minutes to 30 hours. Too short a polymerization time makes the polymerization less likely to proceed, whereas too long renders the polymer product vulnerable to thermal decomposition.

The additional (second) polymerization is carried out at a polymerization temperature 10 to 50° C. lower than that for the aforesaid ring-opening (first) polymerization for a polymerization time of 1 to 50 hours. The temperature for the additional polymerization should be lower than the first polymerization temperature by preferably 15 to 48° C., and more preferably 20 to 45° C. A relatively long time of preferably 1.5 to 30 hours, more preferably 2 to 20 hours, and even more preferably 3 to 15 hours should be applied to the additional polymerization. It is then desired that as the temperature for the additional polymerization becomes low, the polymerization time becomes long.

So far, ring-opening polymerization has been carried out at relatively low temperatures so as to avoid thermal decomposition or coloration of polymer products. However, lower polymerization temperatures make polymer products susceptible to crystallization and solidification during polymerization reactions, and so the polymerization reactions tend to become inhomogeneous with the result that polyhydroxycarboxylic acids having a wide molecular weight distribution yield. Elevated polymerization temperatures, on the other hand, make the molecular weight distribution of polymer products likely to become sharp. Even in this case, however, it is desired to place the amount of catalysts and the type and amount of molecular weight modifiers under control.

When the ring-opening polymerization or the first polymerization is carried out at relatively low temperatures, it is preferred that after the completion of the polymerization reaction, the temperature of the polymerization system be brought up to 220 to 250° C. or the polymer product be hot kneaded for the purpose of reducing low-molecular-weight matters, thereby making the molecular weight distribution of the polymer product sharp.

5. Process for the Production of Polyglycolic Acid Having Melt Stability

For the production of polyglycolic acid particularly excellent in melt stability among the polyhydroxycarboxylic acids of the present invention, it is preferable to make use of the following production process.

The polyglycolic acid of the present invention may be produced by the ring-opening polymerization of glycolide that is a bimolecular cyclic ester of glycolic acid according to the following reaction scheme:

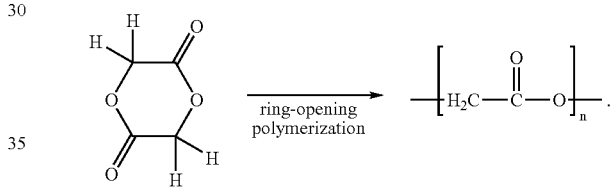

To produce the polyglycolic acid having excellent melt stability, the ring-opening polymerization of glycolide is carried out through a series of steps as mentioned below.

At step (1) glycolide is subjected to ring-opening polymerization in a molten state, at step (2) the resulting polymer is converted from the molten state to a solid state, at step (3) the polymer is further subjected to solid-phase polymerization in the solid state as desired, and at step (4) the solid-state polymer is hot kneaded with the application of heat thereto.

In accordance with the production process of the present invention, the ring-opening polymerization of glycolide is first carried out in a molten state, and the resulting polymer is hot kneaded after conversion to a solid state. Alternatively, after the conversion to the solid state, the polymer is further subjected to solid-phase polymerization, whereupon the polymer is hot kneaded. By use of such a production process it is possible to produce a polymer having a narrow molecular weight distribution and a high retention of melt viscosity, because at the aforesaid step (1) the ring-opening polymerization conditions are regulated to prevent coloration of the polymer product and at the aforesaid step (4) the hot kneading ensures that thermal treatment can be carried out in a uniform molten state for a short period of time while any increase in the yellowness index is reduced.

In the aforesaid step (1) glycolide is subjected to ring-opening polymerization at a temperature of 120° C. to 250° C. in the presence of a small amount of the polymerization catalyst. Generally but not exclusively, the glycolide may be obtained by the thermal depolymerization of glycolic acid oligomers.

By sole use of glycolide it is possible to obtain polyglycolic acid in a homopolymer form. If the glycolide is used in combination with other comonomer(s), it is then possible to obtain a copolymer(s) of polyglycolic acid. For the comonomer(s), use may be made of those already mentioned.

Preferred among the comonomers are cyclic compounds such as lactide, caprolactone and trimethylene carbonate; and hydroxycarboxylic acids such as lactic acid and glycolic acid because they are well sensitive to copolymerization so that copolymers having excellent physical properties can be obtained. The comonomer(s) is used in an amount of usually up to 45% by weight, preferably up to 30% by weight, and more preferably up to 10% by weight of all the charged monomers. By copolymerization it is possible to lower the melting point and, hence, processing temperature of the polyglycolic acid, and control of the rate of crystallization of the polyglycolic acid, thereby improving its processability on extrusion or elongation.

The polymerization catalysts used herein, for instance, include the aforesaid tin compounds, titanium compounds, aluminum compounds, zirconium compounds, and antimony halides; however, the polymerization catalysts according to the present invention are not limited thereto. For adjustment of the weight-average molecular weight, higher alcohols such as lauryl alcohols may be added as the molecular weight modifier, and for the purpose of improving physical properties, polyhydric alcohols such as glycerin may be added.

For the reactor herein used, an appropriate selection may be made from various polymerization vessels such as those of the extruder type, the upright type having a paddle blade, the upright type having a helical ribbon blade, the horizontal extruder or kneader type, the ampoule type and the tubular type.

Depending on purposes, the polymerization temperature may be selected from the range of 120° C. that is a substantial polymerization start temperature to 250° C. The polymerization temperature should be in the range of preferably 130 to 240° C., more preferably 140 to 230° C., and even more preferably 150 to 225° C. Too high a polymerization temperature makes the resulting polymer vulnerable to thermal decomposition. The polymerization time is in the range of 3 minutes to 20 hours, and preferably 5 minutes to 18 hours. Too short a polymerization time renders polymerization less likely to proceed sufficiently, and too long renders the resulting polymer susceptible to coloration.

The optimum polymerization time may be chosen depending on the polymerization temperature, polymerization catalyst, etc. When the reaction takes long at a polymerization temperature exceeding 225° C., the resulting polymer is sensitive to coloration; that is, it is preferable to make the reaction time short. At a polymerization temperature exceeding 225° C., the reaction time should be in the range of 3 to 20 minutes, and preferably 5 to 10 minutes. Preferably in most cases, the ring-opening polymerization at step (1) should be carried out at a temperature of 225° C. or lower in the molten state.

At the aforesaid step (2), the polymer generated at step (1) is converted from the molten state to the solid state. The conversion to the solid state, for instance, may be carried out by (i) cooling the polymer down from the polymerization temperature at which the polymer is in the molten state, (ii) precipitating or crystallizing and solidifying the polymer by carrying out the molten-state polymerization at a temperature lower than the melting point of the final polymer or (iii) adding a nucleating agent (such as talc, clay and titanium oxide) to the polymer.

At step (3) the polymer is further subjected to solid-phase polymerization as desired. The process, wherein the glycolide is subjected to ring-opening polymerization in the molten state, and the product is concerted to the solid state, subjected to solid-phase polymerization and then hot kneaded, is effective to increase the retention of melt viscosity. Although any detailed reason has yet to be clarified, one possible explanation could be that the solid-phase polymerization has an effect on making the polymerization degree profile of the polymer narrow. The solid-phase polymerization is carried out at a temperature at which the polymer is maintained in the solid state. The solid-phase polymerization temperature is in the range of usually 120° C. to less than 220° C. and preferably 140 to 200° C., and the solid-phase polymerization time is in the range of usually 0.1 to 20 hours and preferably 1 to 15 hours.

At the aforesaid step (4), the solid-state polymer is hot kneaded-with the application of heat thereto. By hot kneading the polymer obtained by ring-opening polymerization, it is possible to improve the melt stability of the polymer while any increase in the yellowness index of the polymer is reduced. Hot kneading may be carried out by any suitable means; however, it is preferable to make use of rolls, kneaders, extruders, etc. Particular preference is given to a biaxial kneader or extruder that ensures effective kneading. Although depending on the intended purpose, the object of the present invention may be achieved by carrying out hot kneading two or more times.

The hot-kneading conditions should preferably be set such that the resin temperature be in the range of preferably 220 to 250° C., and more preferably 225 to 245° C. When the resin temperature is too low during hot kneading, no sufficient kneading is achievable with the result that any improvement in melt stability is difficult to achieve. Too high resin temperatures make the polymer vulnerable to coloration. At the hot-kneading step, heat stabilizers may be added to the polymer.

As heat stabilizers, are preferred heavy metal deactivators, phosphates having a pentaerythritol skeleton structure, phosphorus compounds having at least one hydroxyl group and at least one long-chain alkyl ester group, metal carbonates, etc. These compounds may be used either singly or in any combination thereof.

It has been found that many of phosphorus compounds such as phosphate antioxidants rather exhibit an effect to inhibit the melt stability of polyglycolic acid. On the other hand, the phosphates having a pentaerythritol skeleton structure represented by the following formula (I):

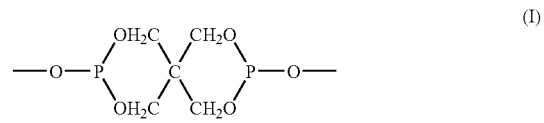

exhibit an effect to specifically improve the melt stability of the polyglycolic acid.

Specific examples of such phosphates having the pentaerythritol skeleton structure include cyclic neopentanetetraylbis(2,6-di-tert-butyl-4-methyl-phenyl)phosphite represented by the formula (1):

(1)

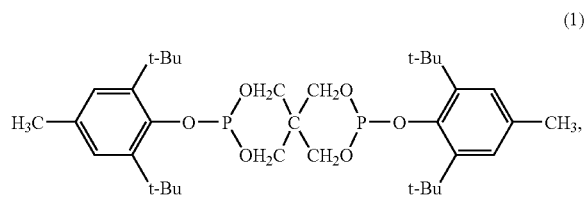

cyclic neopentanetetraylbis(2,6-di-tert-butylphenyl)-phosphite represented by the formula (2):

(2)

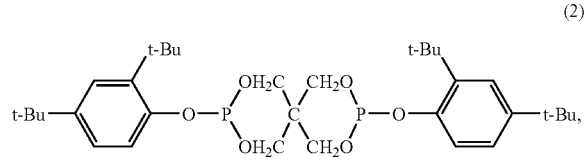

a phosphite antioxidant represented by the formula (3):

(3)

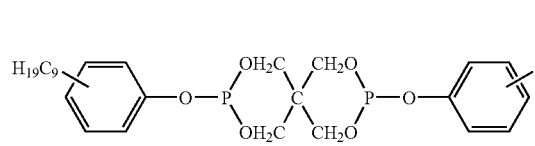

and a phosphite antioxidant represented by the formula (4):

(4)

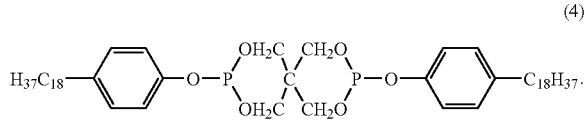

Among these, cyclic neopentanetetraylbis(2,6-di-tert-butyl-4-methylphenyl)phosphite represented by the formula (1) is particularly preferably because it has an effect to markedly enhance the temperature at 3%-weight loss on heating of the polyglycolic acid even by the addition in a small amount.

Among the phosphorus compounds, are preferred phosphorus compounds having at least one hydroxyl group and at least one long-chain alkyl ester group represented by the formula (II):

(II)

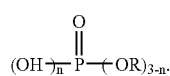

The number of carbon atoms in the long-chain alkyl is preferably within a range of 8 to 24. Specific examples of such phosphorus compounds include mono- or di-stearyl acid phosphate represented by the formula (5):

(5)

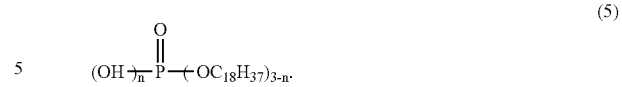

n=1 or 2

Example of the heavy metal deactivators include 2-hydroxy-N-1H-1,2,4-triazol-3-yl-benzamide represented by the formula (6):

(6)

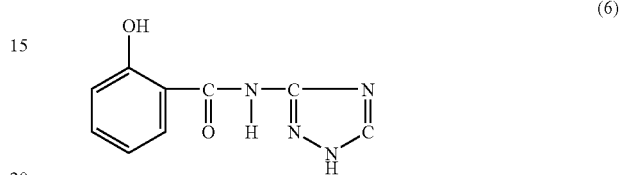

and bis[2-(2-hydroxybenzoyl)hydrazin]dodecanediacid represented by the formula (7):

(7)

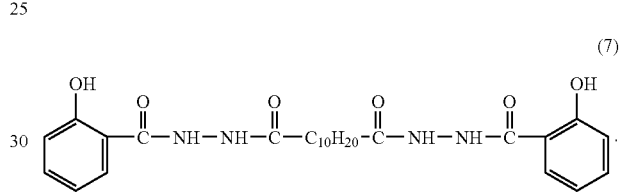

Examples of the metal carbonates include calcium carbonate and strontium carbonate.

A proportion of these heat stabilizer incorporated is generally 0.001 to 5 parts by weight, preferably 0.003 to 3 parts by weight, more preferably 0.005 to 1 part by weight per 100 parts by weight of the crystalline polyglycolic acid. The heat stabilizer is preferably that having an effect to improve the melt stability even by the addition in an extremely small amount. If the amount of the heat stabilizer incorporated is too great, the effect is saturated, or there is a possibility that the transparency of the resulting polyglycolic acid composition may be impaired.

The hot-kneading time is in the range of usually 1 to 20 minutes, preferably 3 to 15 minutes, and more preferably 5 to 10 minutes. Too short a hot-kneading time makes less contributions to melt stability improvements whereas too long makes the polymer vulnerable to coloration.

After the completion of hot kneading, it is preferable to collect the polyglycolic acid in pellet forms, because there is no variation in extrusion due to the properties of powders during molding. Preferable pellet shape has already been explained.

By producing the polyglycolic acid through the aforesaid steps (1) to (4), it is possible to obtain polyglycolic acids improved in terms of melt stability, which has (I) a retention of melt viscosity of at least 40% as defined by the proportion of the viscosity ($\eta 60$) measured after a 60-minute retention at 250° C. to the initial viscosity ($\eta_0$) measured after a 5-minute preheating at 250° C. ($\eta_{60}/\eta_0 \times 100$), and/or (II) a yellowness index (YI) of up to 40 as measured with a sheet obtained by press molding and crystallization of the polyglycolic acid.

According to the aforesaid production process, it is also possible to obtain (III) a polyglycolic acid designed such that when heated from 50° C. at a heating rate of 2° C./min. in a nitrogen stream at a flow rate of 10 ml/min., the temperature at which the per cent loss from weight at 50° C. becomes 1% is 200° C. or higher, (IV) a polyglycolic acid having a melt viscosity in the range of 10 to 100,000 Pa·s as measured at a temperature of 240° C. and a shear rate of 122/second, and (V) a polyglycolic acid having a molecular weight distribution in the range of 1.0 to 2.5 as expressed by the weight-average molecular weight-to-number-average molecular weight ratio (Mw/Mn).

EXAMPLES

The present invention is now explained more specifically with reference to inventive and comparative examples. The physical properties, etc. referred to below are measured as follows.

(1) Weight-Average Molecular Weight & Molecular Weight Distribution

Using a gel permeation chromatography (GPC) analyzer, the weight-average molecular weight (Mw) and molecular weight distribution (Mw/Mn) are measured under the following conditions.

Sodium trifluoroacetate (Kanto Chemical Industries, Ltd.) was added to and dissolved in hexafluoroisopropanol (a product made by Central Glass Co., Ltd. and distilled for use) to prepare a 5 mM solvent of sodium trifluoroacetate (A).

Solvent (A) is flowed through a column (HFIP-LG+HFIP-806M×2 made by SHODEX) at 40° C. at a flow rate of 1 ml/min. to prepare a 10 ml solution with 10 mg of each of polymethyl methacrylates having five known molecular weights of 827,000, 101,000, 34,000, 10,000 and 2,000 (products made by POLYMER LABORATORIES Ltd.). Of each solution, 100 μl was passed through the column to detect the refractive index (RI), thereby finding a detection peak time. The detection peak times and molecular weights of five standard specimens are plotted to prepare calibration curves for molecular weights.

Then, solvent (A) was added to 10 mg of each specimen to prepare a 10 ml solution. Of the solution, 100 μl was passed through the column to find weight-average molecular weight (Mw), number-average molecular weight (Mn) and molecular weight distribution (Mw/Mn) from the resulting elution curve. For calculation, C-R4AGPC Program Ver1.2, made by Shimadzu Corporation, was used.

2. Melt Viscosity

Ten (10) grams of polyhydroxycarboxylic acid sandwiched between aluminum sheets are placed on a press machine preheated to 240° C. After a 30-second preheating, the acid is pressed at 5 Mpa for 15 seconds, after which it is rapidly cooled to make a sheet. The thus obtained amorphous sheet is heated at 150° C. in an oven for 30 minutes for crystallization. The obtained crystallized sheet is cut out into a rectangular piece of 5 mm in width and 50 to 75 mm in length to make a melt viscosity-measuring sample. The weight of the melt viscosity-measuring sample is 7 grams. This sample is put into a cylinder having an inside diameter of 9.55 mm in Capirograph 3C made by Toyo Seiki Co., Ltd., said cylinder being set at 240° C. Then, the sample is preheated for 5 minutes, after which the resin is extruded out of a die of 1 mm in inside diameter and 10 mm in length at a shear rate of 122/second, and the melt viscosity (Pa·s) of the sample is found from the then stress.

(3) Yellowness Index (YI)

Ten (10) grams of polyhydroxycarboxylic acid sandwiched between aluminum sheets are placed on a press machine preheated to 240° C. After a 30-second preheating, the acid is pressed at 5 Mpa for 15 seconds, after which it is rapidly cooled to make a sheet. The thus obtained amorphous sheet is heated at 150° C. in an oven for 30 minutes for crystallization. Using Color Analyzer TC-1800MKII made by Tokyo Denshoku Co, Ltd., the yellowness index (YI) of the crystallized sheet is determined. Three measurements are obtained under the conditions of field of view of 2°, standard light C, and measurement of reflected light to calculate their average defining the yellowness index (YI) of the polyhydroxycarboxylic acid.

(4) Degradability in Soil

After heated and pressed at 240° C. for 30 seconds, polyhydroxycarboxylic acid was rapidly cooled to prepare a sheet. This sheet was buried at a depth of 15 cm in a potato plot at a private house site in the city of Iwaki, Fukushima Prefecture, Japan. More specifically, such sheets were horizontally placed in a 15-cm-deep hole dug in the ground in a non-superimposed manner, and covered with earth. After the lapse of a given period, the ground was carefully turned up to check sheet shape according to the following criteria.

A: The sheet is kept in good shape.

B: The sheet shape disintegrates partly.

C: The sheet disintegrates.

(5) Retention of Melt Viscosity

Using RSDII made by Rheometrics Co., Ltd. in a nitrogen stream, 2 grams of polyglycolic acid are set between parallel plates of ½ inch in diameter at a gap length of 1.5 mm. After a 5-minute preheating at 250° C., the initial viscosity ($\eta_0$; Pa·s) of polyglycolic acid is measured at an angular velocity of 10 rad/s. After a 60-minute retention at 250° C., on the other hand, the viscosity ($\eta_{60}$; Pa·s) of polyglycolic acid is measured at an angular velocity of 10 rad/s. The retention of melt viscosity is calculated from the following equation:
Retention of melt viscosity (%)=($\eta_{60}$)/($\eta_0$)×100

(6) Per Cent Loss in Weight

Using TG50 made by Metler Co., Ltd. in a nitrogen atmosphere wherein nitrogen prevails at a flow rate of 10 ml/min., polyglycolic acid is heated from 50° C. at a heating rate of 2° C./min. to measure the per cent loss in weight. The temperature at which the weight ($W_{50}$) at 50° C. of polyglycolic acid shows a 1% loss is precisely read out. Herein this temperature is used to define the temperature at which the per cent loss in weight of polyglycolic acid becomes 1%.

(7) Moldability

Polyglycolic acid is put into a uniaxial extruder having a cylinder of 20 mm in inside diameter, over which a T-die of 200 mm in width is mounted, wherein the polyglycolic acid is hot extruded in a sheet form. Then, the sheet is wound around a cooling roll for sheet molding. Moldability was evaluated on the following criteria:

A: Stable extrusion molding is feasible over an extended period of time, and the molded sheet is transparent and substantially colorless.

B: Stable extrusion molding is feasible; however, the molded sheet shows a brown color.

C: Fluctuations in extrusion torque are observed during sheet extrusion molding, and there are also breaks in sheets being extruded; stable molding has difficulty.

Example 1

One hundred (100) grams of glycolide, 5 mg of tin tetrachloride and 50 mg of lauryl alcohol were put into a glass test tube for a 3-hour polymerization at 200° C. After the polymerization, an additional 12-hour polymerization was carried out at 160° C. After the additional polymerization, the resulting polymer was cooled, then collected, then pulverized and then washed with acetone. Following this, vacuum drying at 30° C. gave a polymer product. The properties of the obtained polyglycolic acid are shown in Table 1 together with the results of soil degradability test.

Example 2

Polyglycolic acid was prepared as in Example 1 with the exception that the amount of lauryl alcohol was changed to 40 mg. The results are shown in Table 1.

Example 3

Polyglycolic acid was prepared as in Example 1 with the exception that the amount of lauryl alcohol was changed to 5 mg. The results are shown in Table 1.

Comparative Example 1

Polyglycolic acid was prepared as in Example 1 with the exception that no additional polymerization was carried out. The results are shown in Table 1.

Comparative Example 2

Polyglycolic acid was prepared as in Example 3 with the exception that no additional polymerization was carried out. The results are shown in Table 1.

Comparative Example 3

One hundred (100) grams of glycolide, 5 mg of tin tetrachloride and 5 mg of lauryl alcohol were put into a glass test tube for a 2-hour polymerization at 240° C. After the polymerization, the resulting polymer was cooled, then collected, then pulverized and then washed with acetone. Following this, vacuum drying at 30° C. gave a polymer product. The properties of the obtained polyglycolic acid are shown in Table 1 together with the results of soil degradability test.

TABLE 1

| | Ring-Opening Polymerization of Glycolide | | Melt |
|---|---|---|---|
| | Conditions Temp./Time (° C./h) | Additional Polymerization Temp./Time (° C./h) | Viscosity Pa·s (240° C., 122/s) |
| Ex. 1 | 200° C./3 h | 160° C./12 h | 280 |
| Ex. 2 | 200° C./3 h | 160° C./12 h | 460 |
| Ex. 3 | 200° C./3 h | 160° C./12 h | 2,150 |
| Comp. Ex. 1 | 200° C./3 h | — | 320 |
| Comp. Ex. 2 | 200° C./3 h | — | 2,200 |
| Comp. Ex. 3 | 240° C./3 h | — | 2,300 |

TABLE 1-continued

| | | | | Soil Degradability Test | | |
|---|---|---|---|---|---|---|
| | Mw | Mw/Mn | YI | After 2 Weeks | 4 Weeks | 8 Weeks |
| Ex. 1 | 110,000 | 1.9 | 17 | B | C | C |
| Ex. 2 | 135,000 | 2.1 | 18 | A | B | C |
| Ex. 3 | 238,000 | 1.7 | 16 | A | A | C |
| Comp. Ex. 1 | 117,000 | 2.8 | 15 | C | C | C |
| Comp. Ex. 2 | 245,000 | 4.2 | 17 | C | C | C |
| Comp. Ex. 3 | 248,000 | 2.1 | 66 | A | A | C |

Mw: weight-average molecular weight
Mw/Mn: molecular weight distribution
YI: yellowness index As can be seen from the results of Table 1, the polymer samples (Comp. Examples 1–2) having a wide molecular weight distribution exhibit premature disintegration in the soil degradability test irrespective of the magnitude of their weight-average molecular weight. By contrast, the polymer-samples (Inventive Examples 1–3) having a sharp molecular weight distribution are not only reduced in terms of premature disintegration in the ground but also have their rates of biodegradation controllable by the regulation of their weight-average molecular weight.

Example 4

One hundred (100) grams of glycolide and 4 mg of tin dichloride·2H$_2$O were put into a glass test tube wherein they were stirred at 200° C. for 1 hour and then left standing for 3 hours for ring-opening polymerization. After the completion of the polymerization, the resulting polymer was cooled, then taken out, then pulverized, and then washed with acetone. The polymer was then vacuum-dried at 30° C. to collect the polymer. Then, the polymer was put into Labo Plastomill made by Toyo Seiki Co., Ltd., which was preset to 230° C., and melted and kneaded for 10 minutes.

The thus obtained polyglycolic acid was found to have a retention of melt viscosity of 59%, a crystallized sheet's yellowness index (YI) of 27.2, a temperature of 225° C. at which the per cent loss in weight became 1%, a weight-average molecular weight (Mw) of 245,000, a molecular weight distribution (Mw/Mn) of 2.1, and a melt viscosity of 500 Pa·s.

Ten (10) kg of polyglycolic acid obtained in the same manner were put into a uniaxial extruder having a cylinder of 20 mm in inside diameter, over which a T-die of 200 mm in width was mounted. Through the extruder the polymer was extruded in a sheet form, which was then wound around a cooling roll to make a sheet. The obtained sheet was transparent and substantially colorless. Even after the lapse of 6 hours from the start of extrusion, stable molding was feasible. The results are tabulated in Table 2.

Example 5

LT-20 made by Toyo Seiki Co., Ltd. with a 5 mm-holed die was used at 15 rpm and a preset temperature of 200 to 240° C. (resin temperature: 240° C.). Glycolide with 300 ppm of tin tetrachloride·5H$_2$O added thereto was put from a hopper into the assembly for ring-opening polymerization. A strand leaving the die was hot cut to obtain pellets of 6 mm in length and 3 mm in thickness. A dyed pellet was put from the hopper into the assembly to measure the period of time (residence time) until the dyed resin was distilled out. This residence time was found to be 7 minutes. Furthermore, the obtained polymer was put into Labo Plastomill made by Toyo Seiki Co., Ltd., which was preset to 230° C., and melted and kneaded for 15 minutes.

The thus obtained polyglycolic acid was found to have a retention of melt viscosity of 41%, a crystallized sheet's yellowness index (YI) of 16.5, a temperature of 220° C. at which the per cent loss in weight became 1%, a weight-average molecular weight (Mw) of 120,000, a molecular weight distribution (Mw/Mn) of 2.2, and a melt viscosity of 300 Pa·s.

Ten (10) kg of polyglycolic acid obtained in the same manner were put into a uniaxial extruder having a cylinder of 20 mm in inside diameter, over which a T-die of 200 mm in width was mounted. Through the extruder the polymer was extruded in a sheet form, which was then wound around a cooling roll to make a sheet. The obtained sheet was transparent and substantially colorless. Even after the lapse of 6 hours from the start of extrusion, stable molding was feasible. The results are tabulated in Table 2.

Example 6

One hundred (100) grams of glycolide and 4 mg of tin dichloride·2H$_2$O were put into a glass test tube for a 2-hour ring-opening polymerization-at 180° C. After the completion of the reaction, the resulting polymer was solidified. The solid-state polymer was left standing at 160° C. for 10 hours for an additional solid-phase polymerization. After the completion of the polymerization, the polymer was cooled, then taken out, then pulverized, and then washed with acetone. The polymer was then vacuum-dried at 30° C. to collect the polymer. Then, the polymer was put into Labo Plastomill made by Toyo Seiki Co., Ltd., which was preset to 230° C., and melted and kneaded for 10 minutes.

The thus obtained polyglycolic acid was found to have a retention of melt viscosity of 65%, a crystallized sheet's yellowness index (YI) of 15.8, a temperature of 231° C. at which the per cent loss in weight becomes 1%, a weight-average molecular weight (Mw) of 290,000, a molecular weight distribution (Mw/Mn) of 1.8, and a melt viscosity of 800 Pa·s.

Ten (10) kg of polyglycolic acid obtained in the same manner were put into a uniaxial extruder having a cylinder of 20 mm in inside diameter, over which a T-die of 200 mm in width was mounted. Through the extruder the polymer was extruded in a sheet form, which was then wound around a cooling roll to make a sheet. The obtained sheet was transparent and substantially colorless. Even after the lapse of 6 hours from the start of extrusion, stable molding was feasible. The results are tabulated in Table 2.

Example 7

One hundred (100) grams of glycolide and 5 mg of tin dichloride·2H$_2$O were put into a glass test tube for a 4-hour ring-opening polymerization at 180° C. After the completion of the reaction, the resulting polymer was solidified. The polymer was cooled, then taken out, then pulverized, and then washed with acetone. The polymer was then vacuum-dried at 30° C. to collect the polymer. The obtained polymer was extruded through LT-20 made by Toyo Seiki Co., Ltd. with a 5 mm-holed die operating at 30 rpm and a preset temperature of 200 to 240° C. (resin temperature: 240° C.). A strand leaving the die was hot cut to obtain pellets of 6 mm in length and 3 mm in thickness. A dyed pellet was put from the hopper into the assembly to measure the period of time (residence time) until the dyed resin was distilled out. This residence time was found to be 5.5 minutes.

The thus obtained polyglycolic acid was found to have a retention of melt viscosity of 61%, a crystallized sheet's yellowness index (YI) of 10.2, a temperature of 230° C. at which the per cent loss in weight became 1%, a weight-average molecular weight (Mw) of 260,000, a molecular weight distribution (Mw/Mn) of 1.9, and a melt viscosity of 780 Pa·s.

Ten (10) kg of polyglycolic acid obtained in the same manner were put into a uniaxial extruder having a cylinder of 20 mm in inside diameter, over which a T-die of 200 mm in width was mounted. Through the extruder the polymer was extruded in a sheet form, which was then wound around a cooling roll to make a sheet. The obtained sheet was transparent and substantially colorless. Even after the lapse of 12 hours from the start of extrusion, stable molding was feasible. The results are tabulated in Table 2.

Example 8

Following Example 7, 100 grams of glycolide and 5 mg of tin dichloride·2H$_2$o were charged in a glass test tube for a 4-hour ring-opening polymerization at 180° C. One hundred (100) parts by weight of the collected polyglycolic acid were mixed with 0.03 part by weight of a heat stabilizer, i.e., a phosphate antioxidant represented by the aforesaid formula (4) (PEP-8 made by Asahi Denka Kogyo Co., Ltd.) to obtain a mixture, which was then fed into an extruder LT-20 to prepare pellets as in Example 7. The results are tabulated in Table 2.

Example 9

One hundred (100) grams of glycolide and 3 mg of tin dichloride·2H$_2$O were put into a glass test tube for a 24-hour ring-opening polymerization at 170° C. After the completion of the polymerization, the polymer was cooled, then taken out, then pulverized, and then washed with acetone. Then, the polymer product was put into Labo Plastomill made by Toyo Seiki Co., Ltd., which was preset to 230° C., and melted and kneaded for 10 minutes.

The thus obtained polyglycolic acid was found to have a retention of melt viscosity of 60%, a crystallized sheet's yellowness index (YI) of 13.4, a temperature of 229° C. at which the per cent loss in weight becomes 1%, a weight-average molecular weight (Mw) of 239,000, a molecular weight distribution (Mw/Mn) of 2.2, and a melt viscosity of 770 Pa·s.

Ten (10) kg of polyglycolic acid obtained in the same manner were put into a uniaxial extruder having a cylinder of 20 mm in inside diameter, over which a T-die of 200 mm in width was mounted. Through the extruder the polymer was extruded in a sheet form, which was then wound around a cooling roll to make a sheet. The obtained sheet was transparent and substantially colorless. Even after the lapse of 6 hours from the start of extrusion, stable molding was feasible. The results are tabulated in Table 2.

Comparative Example 4

One hundred (100) grams of glycolide and 5 mg of tin dichloride·2H$_2$O were put into a reactor having a helical ribbon blade, wherein they were stirred at 230° C. for 2 hours for ring-opening polymerization. After the completion of the reaction, the polymer was scraped out, and the washed with acetone. Then, the polymer was vacuum-dried at 30° C. to collect the polymer.

The thus obtained polyglycolic acid was found to have a retention of melt viscosity of 42%, a crystallized sheet's yellowness index (YI) of 67.8, a temperature of 230° C. at which the per cent loss in weight became 1%, a weight-average molecular weight (Mw) of 250,000, a molecular weight distribution (Mw/Mn) of 2.2, and a melt viscosity of 750 Pa·s.

Ten (10) kg of polyglycolic acid obtained in the same manner were put into a uniaxial extruder having a cylinder of 20 mm in inside diameter, over which a T-die of 200 mm in width was mounted. Through the extruder the polymer was extruded in a sheet form, which was then wound around a cooling roll to make a sheet. The obtained sheet was brown. Although stable extrusion molding was feasible, yet the color tone of the polymer was less than satisfactory. The results are tabulated in Table 2.

Comparative Example 5

One hundred (100) grams of glycolide and 5 mg of tin dichloride·2H$_2$O were put into a glass test tube, wherein they were left standing at 180° C. for 4 hours for ring-opening polymerization. Upon the completion of the polymerization, the polymer was solidified. The polymer was cooled, then taken out, then pulverized, and then washed with acetone. Then, the polymer was vacuum-dried at 30° C. to collect the polymer.

The thus obtained polyglycolic acid was found to have a retention of melt viscosity of 21%, a crystallized sheet's yellowness index (YI) of 10.1, a temperature of 190° C. at which the per cent loss in weight became 1%, a weight-average molecular weight (Mw) of 250,000, a molecular weight distribution (Mw/Mn) of 2.7, and a melt viscosity of 970 Pa·s.

Ten (10) kg of polyglycolic acid obtained in the same manner were put into a uniaxial extruder having a cylinder of 20 mm in inside diameter, over which a T-die of 200 mm in width was mounted. Through the extruder the polymer was extruded in a sheet form, which was then wound around a cooling roll to make a sheet. The obtained sheet was transparent and substantially colorless. However, fluctuations of extrusion torque were observed with frequent breaks in sheets being extruded; any stable molding was unfeasible. There were also large amounts of volatile components generated during extrusion with deposition of the volatile components onto the roll. The results are tabulated in Table 2.

TABLE 2

| | Polyglocolic Acid | | |
| --- | --- | --- | --- |
| | Melt Viscosity Pa · s (240° C., 122/s) | Weight-Average Molecular Weight (Mw) | Molecular Weight Distribution (Mw/Mn) |
| Example 4 | 500 | 245,000 | 2.1 |
| Example 5 | 300 | 120,000 | 2.2 |
| Example 6 | 800 | 290,000 | 1.8 |
| Example 7 | 780 | 260,000 | 1.9 |
| Example 8 | 800 | 260,000 | 1.9 |
| Example 9 | 770 | 239,000 | 2.2 |
| Comp. Ex. 4 | 750 | 250,000 | 2.2 |
| Comp. Ex. 5 | 970 | 250,000 | 2.7 |

| | Properties | | |
| --- | --- | --- | --- |
| | Retention of Melt Viscosity (%) | YI | Temperature At Which The Per Cent Loss In Weight Became 1% (° C.) |
| Example 4 | 59 | 27.2 | 225 |
| Example 5 | 41 | 16.5 | 220 |
| Example 6 | 65 | 15.8 | 231 |
| Example 7 | 61 | 10.2 | 230 |
| Example 8 | 82 | 9.5 | 233 |
| Example 9 | 60 | 13.4 | 229 |
| Comp. Ex. 4 | 42 | 67.8 | 230 |
| Comp. Ex. 5 | 21 | 10.1 | 190 |

| | Soil Degradability Test | | | |
| --- | --- | --- | --- | --- |
| | After 2 Weeks | 4 Weeks | 8 Weeks | Moldability |
| Example 4 | A | B | C | A |
| Example 5 | B | C | C | A |
| Example 6 | A | A | C | A |
| Example 7 | A | A | C | A |
| Example 8 | A | A | A | A |
| Example 9 | A | A | C | A |
| Comp. Ex. 4 | B | C | C | B |
| Comp. Ex. 5 | C | C | C | C |

As can be seen from the results of Table 2, the present polyglycolic acids having melt stability (Inventive Examples 4 to 7) have a high retention of melt viscosity and a low yellowness index (YI) and are so improved in moldability that transparent, substantially colorless sheets can be obtained in a stable fashion. The present polyglycolic acids having melt stability (Inventive Examples 4 to 7) are also controllable in terms of biodegradability by the regulation of their weight-average molecular weight and molecular weight distribution.

By contrast, the polyglycolic acid that has not been hot kneaded after the ring-opening polymerization has a high yellowness index (YI) even when the polymerization is carried out under such conditions as to give a narrow molecular weight distribution (low Mw/Mn) (Comparative Example 4) with the results that molded articles assume a brown color. Also, the polyglycolic acid that has not been hot kneaded after the ring-opening polymerization has a very low retention of melt viscosity and a lowering of the temperature at which the per cent loss in weight becomes 1% and is poor in melt stability and moldability as well, even when the polymerization is carried out such conditions as to make the yellowness index (YI) low (Comparative Example 5). Further, the polyglycolic acid of Comparative Example 2 has difficulty in controlling the degree of biodegradability.

INDUSTRIAL APPLICABILITY

According to the present invention, there are provided polyhydroxycarboxylic acids controlled in terms of the rate of biodegradation and reduced in terms of coloration. According to the present invention, there is also provided a polyhydroxycarboxylic acid ensuring that its molded articles are of uniform quality with neither any premature strength drop nor any premature deterioration of retention of outside shape. According to the present invention, there are further provided a less colored polyglycolic acid having excellent melt stability and its production process. In particular, the polyglycolic acid having melt stability according to the present invention is of biodegradability and improved in gas barrier properties, heat resistance, moldability, mechanical strength, etc.

The polyhydroxycarboxylic acids of the present invention are useful for various molded or otherwise formed articles such as sheets, films and fibers, composite materials (e.g., multilayer films or containers) and so on. The polyhydroxycarboxylic acids of the present invention, because they can have controlled rates of biodegradation, are easily fitted for intended use in various application fields.

The invention claimed is:

1. A polyglycolic acid obtained by ring-opening polymerization of glycolide or glycolide with other cyclic comonomer(s) in an amount of up to 10% by weight of all the charged monomers, which has the following properties (a) to (c):
   (a) a weight-average molecular weight Mw in the range of 10,000 to 1,000,000,
   (b) a molecular weight distribution in the range of 1.0 to 2.5 as represented by a weight-average molecular weight-to-number-average molecular weight ratio Mw/Mn, and
   (c) a yellowness index YI of up to 40 as measured using a sheet obtained by press molding and crystallization of said polyglycolic acid.

2. The polyglycolic acid according to claim 1, which has (d) a retention of melt viscosity of at least 40% as defined by a proportion of the viscosity ($\eta_{60}$) of said polyglycolic acid measured after a 60-minute retention at 250° C. to the initial viscosity ($\eta_0$) of said polyglycolic acid measured after a 5-minute preheating at 250° C. (($\eta_{60}/\eta_0$)×100).

3. The polyglycolic acid according to claim 1, wherein (e) when said polyglycolic acid is heated from 50° C. at a heating rate of 2° C./min. in a nitrogen stream at a flow rate of 10 ml/min., a 1% weight loss from the polyglycolic acid weight at 50° C. occurs at a temperature not less than 200° C.

4. The polyglycolic acid according to claim 1, which has (f) a melt viscosity in the range of 10 to 100,000 Pa·s as measured at a temperature of 240° C. and a shear rate of 122/second.

5. A polyglycolic acid obtained by ring-opening polymerization of glycolide or glycolide with other cyclic comonomer(s) in an amount of up to 10% by weight of all the charged monomers and having melt stability, which has:
   (I) a retention of melt viscosity of at least 40% as defined by a proportion of the viscosity ($\eta_{60}$) of said polyglycolic acid measured after a 60-minute retention at 250° C. to the initial viscosity ($\eta_0$) of said polyglycolic acid measured after a 5-minute preheating at 250° C. (($\eta_{60}/\eta_0$)×100), and
   (II) a yellowness index (YI) of 40 or less as measured using a sheet obtained by press molding and crystallization of said polyglycolic acid.

6. The polyglycolic acid having melt stability according to claim 5, wherein (III) when said polyglycolic acid is heated from 50° C. at a heating rate of 2° C./min. in a nitrogen stream at a flow rate of 10 ml/min., a 1% loss from the polyglycolic acid weight at 50° C. occurs at a temperature not less than 200° C.

7. The polyglycolic acid having melt stability according to claim 5, which has (LV) a melt viscosity in the range of 10 to 100,000 Pa·s as measured at a temperature of 240° C. and a shear rate of 122/second.

8. The polyglycolic acid having melt stability according to claim 5, which has (V) a weight-average molecular weight (Mw) in the range of 10,000 to 1,000,000 and a molecular weight distribution in the range of 1.0 to 2.5 as represented by a weight-average molecular weight-to-number-average molecular weight ratio (Mw/Mn).

9. A pellet of 1 to 10 mm in length and 1 to 10 mm in thickness, which is formed of the polyglycolic acid according to claim 5.

10. A polyhydroxycarboxylic acid production process, comprising ring-opening polymerization of a cyclic ester at 120 to 250° C. for 3 minutes to 50 hours, and an additional polymerization that is carried out at a temperature 10 to 50° C. lower than the temperature for said ring-opening polymerization for 1 to 50 hours.

11. A polyhydroxycarboxylic acid production process, comprising ring-opening polymerization of a cyclic ester at 120 to 250° C. for 3 minutes to 50 hours, and an additional polymerization that is carried out at a temperature 10 to 50° C. lower than the temperature for said ring-opening polymerization for 1 to 50 hours, wherein a polyhydroxycarboxylic acid having:
   (a) a weight-average molecular weight (Mw) in the range of 10,000 to 1,000,000,
   (b) a molecular weight distribution in the range of 1.0 to 2.5 as represented by a weight-average molecular weight-to-number-average molecular weight ratio (Mw/Mn), and
   (c) a yellowness index (YI) of up to 40 as measured using a sheet obtained by press molding and crystallization of said polyhydroxycarboxylic acid is produced.

12. A process for producing a polyglycolic acid having melt stability, comprising steps of:
   (1) subjecting glycolide or glycolide with other cyclic comonomer(s) in an amount of up to 10% by weight of all the charged monomers to ring-opening polymerization in a molten state at a temperature of 140 to 230° C.,
   (2) converting a polymer product from the molten state to a solid state by (i) cooling the polymer down from the polymerization temperature at which the polymer is in the molten state, (ii) precipitating or crystallizing and solidifying the polymer by carrying out the molten-state polymerization at a temperature lower than the melting point of the final polymer, or (iii) adding a nucleating agent to the polymer, and
   (3) hot kneading the solid-state polymer product with application of heat thereto at a temperature of 220 to 250° C. in a time range of 5 to 20 minutes.

13. The production process according to claim 12, wherein the hot-kneading of the polymer at step (3) is carried out using a roll, a kneader or an extruder.

14. The production process according to claim 12, wherein a polyglycolic acid having (I) a retention of melt viscosity of at least 40% as defined by a proportion of the viscosity ($\eta_{60}$) of said polyglycolic acid measured after a 60-minute retention at 250° C. to the initial viscosity ($\eta_0$) of said polyglycolic acid measured after a 5-minute preheating at 250° C. (($\eta_{60}/\eta_0$)×100) is produced.

15. The production process according to claim 12, wherein a polyglycolic acid having (II) a yellowness index (YI) of 40 or less as measured using a sheet obtained by press molding and crystallization of said polyglycolic acid is produced.

16. The production process according to claim 12, wherein a polyglycolic acid wherein (III) when said polyglycolic acid is heated from 50° C. at a heating rate of 2° C./min. in a nitrogen stream at a flow rate of 10 ml/min., a 1% loss from the polyglycolic acid weight at 50° C. occurs at a temperature not less than 200° C. is produced.

17. The production process according to claim 12, wherein a polyglycolic acid having (IV) a melt viscosity in the range of 10 to 100,000 Pa·s as measured at a temperature of 240° C. and a shear rate of 122/second is produced.

18. The production process according to claim 12, wherein a polyglycolic acid having (V) a weight-average molecular weight (Mw) in the range of 10,000 to 1,000,000 and a molecular weight distribution in the range of 1.0 to 2.5 as represented by a weight-average molecular weight-to-number-average molecular weight ratio (Mw/Mn) is produced.

19. The production process according to claim 12, which further comprises, between said steps (2) and (3), the following step: subjecting the polymer product to solid-phase polymerization at a temperature of 120° C. to less than 220° C. in a time range of 0.1 to 20 hours.

20. The production process according to claim 12, wherein, at the hot kneading step (3), at least one heat stabilizer selected from the group consisting of metal activators, phosphates having a pentaerythritol skeleton structure, phosphorus compounds having at least one hydroxyl group and at least one long-chain alkyl ester group, and metal carbonates, is added to the solid-state polymer product.

21. A process for producing a polyglycolic acid having melt stability, comprising steps of:
(1) subjecting glycolide or glycolide with other cyclic comonomer(s) in an amount of up to 10% by weight of all the charged monomers to ring-opening polymerization in a molten state at a temperature of 140 to 230° C.,
(2) converting a polymer product from the molten state to a solid state by (i) cooling the polymer down from the polymerization temperature at which the polymer is in the molten state, (ii) precipitating or crystallizing and solidifying the polymer by carrying out the molten-state polymerization at a temperature lower than the melting point of the final polymer, or (iii) adding a nucleating agent to the polymer,
(3) subjecting the polymer product to solid-phase polymerization at a temperature of 120° C. to less than 220° C. in a time range of 0.1 to 20 hours, and
(4) hot kneading the solid-state polymer product with application of heat thereto at a temperature of 220 to 250° C. in a time range of 5 to 20 minutes.

22. A process for producing a polyglycolic acid having melt stability, comprising steps of:
(1) subjecting glycolide or glycolide with other cyclic comonomer(s) in an amount of up to 10% by weight of all the charged monomers to ring-opening polymerization in a molten state at a temperature of 140 to 230° C.,
(2) converting a polymer product from the molten state to a solid state by (i) cooling the polymer down from the polymerization temperature at which the polymer is in the molten state, (ii) precipitating or crystallizing and solidifying the polymer by carrying out the molten-state polymerization at a temperature lower than the melting point of the final polymer, or (iii) adding a nucleating agent to the polymer, and
(3) hot kneading the solid-state polymer product with application of heat thereto at a temperature of 220 to 250° C. in a time range of 5 to 20 minutes,
wherein, at the hot kneading step (3), at least one heat stabilizer selected from the group consisting of metal activators, phosphates having a pentaerythritol skeleton structure, phosphorus compounds having at least one hydroxyl group and at least one long-chain alkyl ester group, and metal carbonates, is added to the solid-state polymer product.

* * * * *